US009200725B2

(12) United States Patent
Dohi et al.

(10) Patent No.: US 9,200,725 B2
(45) Date of Patent: Dec. 1, 2015

(54) OPENING DEGREE DETECTION DEVICE FOR MANUAL VALVE

(75) Inventors: Ryousuke Dohi, Osaka (JP); Atsuo Tomita, Osaka (JP); Kouji Nishino, Osaka (JP); Nobukazu Ikeda, Osaka (JP); Hideyuki Miyagawa, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 220 days.

(21) Appl. No.: 13/885,463

(22) PCT Filed: Nov. 14, 2011

(86) PCT No.: PCT/JP2011/076143

§ 371 (c)(1), (2), (4) Date: Sep. 6, 2013

(87) PCT Pub. No.: WO2012/067055

PCT Pub. Date: May 24, 2012

(65) Prior Publication Data

US 2013/0333777 A1 Dec. 19, 2013

(30) Foreign Application Priority Data

Nov. 16, 2010 (JP) ................................ 2010-255604

(51) Int. Cl.
*F16K 37/00* (2006.01)

(52) U.S. Cl.
CPC ......... *F16K 37/0016* (2013.01); *F16K 37/0041* (2013.01); *Y10T 137/8275* (2015.04)

(58) Field of Classification Search
CPC .. F16K 37/00; F16K 37/0041; F16K 37/0016
USPC .......... 137/553, 554, 556, 557; 73/865.9, 168
See application file for complete search history.

(56) References Cited

U.S. PATENT DOCUMENTS

| | | | | |
|---|---|---|---|---|
| 3,850,196 | A * | 11/1974 | Fales | 137/554 |
| 5,706,855 | A * | 1/1998 | Heiniger | 137/554 |
| 6,945,509 | B2 * | 9/2005 | Royse | 251/129.04 |
| 2004/0045608 | A1 | 3/2004 | Peters et al. | |
| 2008/0087334 | A1 * | 4/2008 | Reilly et al. | 137/554 |

FOREIGN PATENT DOCUMENTS

| | | | |
|---|---|---|---|
| JP | 08-285130 | A | 11/1996 |
| JP | 08-326950 | A | 12/1996 |
| JP | 2003-042332 | A | 2/2003 |
| JP | 2004-514846 | A | 5/2004 |
| WO | WO-02/40914 | A3 | 5/2002 |

OTHER PUBLICATIONS

International Search Report dated Dec. 13, 2011, issued for PCT/JP2011/076143.

* cited by examiner

*Primary Examiner* — Craig Schneider
*Assistant Examiner* — Daniel P Donegan
(74) *Attorney, Agent, or Firm* — Locke Lord LLP

(57) ABSTRACT

A handle 13 is formed in a hollow shape. A displacement sensor 4 is fixed to an inner surface of the handle 13. The target 5 includes: a target body 22 which is arranged at a position away from a valve stem by a predetermined distance in the handle 13; a detection-use inclined surface 23 which is formed on a surface of the target body 22 which faces the displacement sensor 4 in an opposed manner; and a downwardly projecting portion 25 which projects downward from the target body 22. A lower surface of the downwardly projecting portion 25 of the target 5 is received by a valve body 11*b* so that the target 5 is rotated together with the handle 13 but is not upwardly and downwardly moved with respect to the valve body 11*b*.

7 Claims, 6 Drawing Sheets

8
27
28
22a
26
5
3
22
15
16
23
13
4
14b
14
29
21
14a
12
30
11b
11
24
25
24a 27
26
22a
33
3
34
15
35
28
22
33a
33b
28
29
13
31
5
14b
14
14c
31a
24
30
32
26
35
25
14a
24a
11b
11

OPENING DEGREE DETECTION DEVICE FOR MANUAL VALVE

TECHNICAL FIELD

The present invention relates to an opening degree detection device for a manual valve which is mounted on a manual valve where a fluid flow path in a valve body is opened or closed along with a rotational operation of a handle, and detects an opening degree of the fluid flow path.

BACKGROUND ART

To detect an open/close state of a fluid flow path in a manual valve, there has been known a device which detects an upper end position and a lower end position of a valve stem using limit switches. Although such an opening degree detection device can detect a fully open state or a fully closed state, the opening degree detection device has a drawback that the opening degree detection device cannot detect an intermediate state such as the opening degree of 5% or the opening degree of 95%. In view of the above, patent literature 1 proposes an opening degree detection device for a manual valve where, using a displacement sensor fixed to a valve body by way of a mounting fitting and a tapered cylindrical target integrally mounted on a handle and a valve stem, the opening degree of the fluid flow path is detected based on a measured value of the displacement sensor which is arranged so as to face a detection-use inclined surface (tapered cylindrical surface) of the target which moves along with the upward and downward movement of the valve stem.

CITATION LIST

Patent Literature

PTL 1: JP-A-8-326950

SUMMARY OF INVENTION

Technical Problem

In the opening degree detection device for a manual valve disclosed in patent literature 1, the mounting fitting for the displacement sensor projects from the valve body, and the detection-use inclined surface of the tapered cylindrical target and the displacement sensor are exposed to the outside and hence, an operator's hand or the like touches the mounting fitting for the displacement sensor or the target at the time of operating the handle and the like and thereby the setting of the displacement sensor or the target is liable to be changed from an initial setting state. Further, the displacement sensor is liable to cause a malfunction and hence, there has been a drawback that the displacement sensor lacks in detection reliability over a long period of time.

Also in the opening degree detection device for a manual valve disclosed in the above-mentioned patent literature 1, the target is rotatable relative to the fixed displacement sensor and hence, a surface of the target which is made so as to face the displacement sensor is changed. Accordingly, a value acquired by the displacement sensor is changed by being influenced by an eccentric error or the difference in surface state of the target thus giving rise to a drawback that the accuracy of detection of a valve stem position (opening degree of the fluid flow path) calculated based on a distance between the displacement sensor and a detection-use inclined surface of the target is lowered.

It is an object of the present invention to provide an opening degree detection device for a manual valve where the detection reliability can be ensured over a long period of time, and the detection accuracy of the opening degree of the fluid flow path can be enhanced.

Solution to Problem

The present invention is directed to an opening degree detection device for a manual valve which is mounted on a manual valve where a fluid flow path formed in the inside of a valve body is opened or closed along with the rotational operation of a handle, wherein the opening degree detection device includes a displacement sensor and a target having a detection surface which is made so as to face the displacement sensor, and the displacement sensor and the target are arranged in the inside of the handle which is formed in a hollow shape.

"Valve body" means, out of constitutional elements of the manual valve, a stationary portion which is constituted of a valve casing in which the fluid flow path and a valve seat are formed, a bonnet having a female threaded portion which is threadedly engaged with a male threaded portion formed on a valve stem and the like.

The manual valve may be, for example, a diaphragm valve where a diaphragm is used as a valve element, and a fluid flow path is closed by pushing the diaphragm to a valve seat by a diaphragm pusher. However, the manual valve to which the present invention is applicable is not limited with respect to a valve element and other constitutions provided that the fluid flow path formed in a valve body is closed or opened by the upward and downward movement of a valve stem along with a rotational operation of a handle.

As the displacement sensor, it may be possible to use, for example, a displacement sensor which includes a planar coil, an oscillation circuit and an integration circuit, changes a transmission frequency corresponding to a change in distance between the displacement sensor and a conductor which faces the displacement sensor in an opposed manner, converts the frequency into an integrated value by the integration circuit, and outputs the integrated value as a digital signal. However, the displacement sensor is not limited to such a sensor.

The displacement sensor and the target are mounted on the handle such that either one of the displacement sensor and the target is fixed to an inner surface of the handle, and the other is rotatable together with the handle but is not upwardly and downwardly movable with respect to the valve body during the rotation. For example, the displacement sensor is fixed to a peripheral wall of a handle base by way of a sensor support member having a suitable shape, and the target is supported on the handle in a state where the target is positioned in the vertical direction with respect to the valve body. It may be possible to mount the displacement sensor and the target such that the target is fixed to the handle, and the sensor is supported on the handle in a state where the sensor is positioned with respect to the valve body.

According to the opening degree detection device for a manual valve of the present invention, the displacement sensor and the target are protected by the handle and hence, the detection reliability can be ensured over a long period of time, and the detection accuracy of the opening degree of the fluid flow path can be enhanced. Further, the displacement sensor and the target are integrally mounted on the handle and hence, the opening degree detection device for a manual valve can be easily exchanged. Further, by exchanging a handle of an existing manual valve for the handle in which the opening degree detection device for a manual valve of the present invention is incorporated, it is possible to easily acquire a manual valve provided with the opening degree detection device having the above-mentioned advantageous effects.

It is preferable that the displacement sensor and the target are rotated along with the rotation of the handle such that the sensor surface and the detection surface of the target always face each other in an opposed manner.

Due to such a constitution, the detection surface of the target which is made so as to face the sensor surface of the displacement sensor is not changed. Accordingly, there is no possibility that a value obtained by the displacement sensor will be changed by being influenced by an eccentric error or the difference in surface state of the target and hence, the excellent detection accuracy can be acquired with respect to the valve stem position (opening degree of the fluid flow path) calculated based on the distance between the displacement sensor and the detection-use inclined surface of the target. It is unnecessary to form the detection surface into a tapered cylindrical shape, and it is sufficient that the detection surface be formed of an inclined surface which faces a sensor surface of the displacement sensor in an opposed manner.

It is preferable that the target include: a target body which is arranged at a position away from a valve stem by a predetermined distance in the handle; a detection-use inclined surface which is formed on a surface of the target body which faces the displacement sensor in an opposed manner; and a downwardly projecting portion which projects downward from the target body, wherein a through hole which allows the downwardly projecting portion of the target to pass therethrough in an upwardly and downwardly movable manner is formed in a bottom wall of the handle, and a lower surface of the downwardly projecting portion of the target is received by the valve body so that the target is rotated together with the handle but is not upwardly and downwardly moved with respect to the valve body.

Due to such a constitution, when a handle is rotated, the displacement sensor is rotated together with the handle so that the displacement sensor is moved upward and downward with respect to the valve body. Nevertheless, the downwardly projecting portion of the target is allowed to pass through the through hole formed in the bottom wall of the handle and the lower surface of the downwardly projecting portion is received by the valve body so that the target is not upwardly and downwardly moved with respect to the valve body at the time of rotating the handle. Accordingly, a distance between the displacement sensor and the detection-use inclined surface is changed, and the opening degree of the fluid flow path can be detected by converting the change in distance into an upward and downward movement distance of the valve stem. The target is supported by a suitable target support means, and is integrally rotated with the handle and hence, the detection-use inclined surface of the target is rotated together with the displacement sensor. Accordingly, even when an error exists in mounting the target and the displacement sensor respectively, there is no possibility that such an error is included in a value measured by the displacement sensor so that the excellent detection accuracy can be acquired.

In the above-mentioned constitution, it is preferable that the target is biased downward by a biasing member (compression coil spring, for example).

The target support means may be provided by realizing fitting between the through hole formed in the bottom wall of the handle and the downwardly projecting portion of the target as spline fitting, and may be provided by making the target non-rotatable with respect to a guide shaft which guides the target.

For example, the handle may be configured such that the handle includes: a handle base which has a peripheral wall and a bottom wall and has a center portion of the bottom wall thereof fixed to the valve stem; and a handle cover which is mounted on the handle base as a cover, wherein the target body is formed in an approximately rectangular parallelepiped shape, the detection-use inclined surface and the downwardly projecting portion are formed on a center portion of the target body in the longitudinal direction, a pair of guide shaft insertion holes are formed on both sides of the target body in the longitudinal direction such that the guide shaft insertion holes sandwich a portion where the detection-use inclined surface is formed and a portion where the downwardly projecting portion is formed, a lower end of each guide shaft which is allowed to pass through each guide shaft insertion hole is received by the handle base, an upper end of each guide shaft is received by a pusher member, and the pusher member is fixed to the handle base and thereby the target is upwardly and downwardly movable with respect to the handle by being guided by the pair of guide shafts.

Due to such a constitution, when the target is upwardly and downwardly moved with respect to the handle, there is no possibility that the target will be inclined or caught by other parts so that the smooth movement of the target can be ensured whereby the excellent detection accuracy is acquired.

It is further preferable that a cylindrical linear bushing which guides the guide shaft be inserted into each guide shaft insertion hole formed in the target, a compression coil spring be fitted on an upper portion of each guide shaft, an upper end of the compression coil spring be received by a pusher member, and a lower end of the compression coil spring be received by an upper surface of the linear bushing.

The linear bushing includes: an outer sleeve which is assembled to the guide shaft on which a raceway groove is formed such that the outer sleeve is linearly movable relative to the guide shaft; and a plurality of balls mounted between the raceway groove formed on the guide shaft and a raceway groove formed on the outer sleeve. The smooth relative movement is ensured between the guide shaft and the outer sleeve due to rolling of the plurality of balls.

A gap formed between the guide shaft and the linear bushing is minimized so as to eliminate a play between both members. With the use of the linear bushing in which balls roll, the target can be moved smoothly relative to the guide shaft without the play. Further, since the compression coil spring pushes the linear bushing, the whole target is always biased downward whereby the play of the target is also prevented.

The target may be configured such that the downwardly projecting portion of the target is formed of a ball plunger which is mounted on the target body, a male threaded portion is formed on an outer periphery of the ball plunger, a through female threaded portion corresponding to the male threaded portion of the ball plunger is formed on the target body, the ball plunger is threadedly engaged with the through female threaded portion of the target body from below, the ball plunger is positioned in and fixed to the target body by a male threaded member which is threadedly engaged with the through female threaded portion of the target body from above, and a ball which is positioned on a lower end of the ball plunger is received by the valve body.

It is needless to say that the downwardly projecting portion of the target may be integrally formed with the target body. However, with the use of the ball plunger, the movement of the target in a state where the downwardly projecting portion of the target is received by the valve body becomes smooth and hence, the detection accuracy is further enhanced.

The displacement sensor may be configured such that the displacement sensor is fixed to the handle by way of a sensor support member, and a biasing member which applies a resilient force to the target body is mounted on the sensor support member.

When a play is generated along with the movement of the target body with respect to the sensor support member, the detection accuracy is lowered. Such a play of the target body can be suppressed by the biasing member.

In the opening degree detection device for a manual valve of the present invention, it is preferable that, in addition to the target and the displacement sensor, a CPU which executes predetermined processing in accordance with a program, a radio module, and a battery which supplies electricity to these parts be further assembled into the inside of the handle.

Due to such a constitution, the opening degree of a manual valve can be detected at a position remote from a place where the manual valve is installed by obtaining the opening degree of a fluid flow path using a value measured by the displacement sensor and by transmitting the opening degree to a data monitoring system installed outside.

Further, by integrally mounting the displacement sensor, the CPU, the radio module and the battery in the handle, the maintenance and the exchange of the valve can be easily performed. Still further, by storing displacement values from a fully opened state to a fully closed state and by applying linear correction to the displacement values using the CPU and a built-in memory, irregularities in performances of the valves can be absorbed. Further, by mounting LED display lamps on the handle, it is also possible to inform an operator of a radio communication state and a valve operation state.

In this specification, with respect to "upward and downward", upward means a handle side of a manual valve and downward means a valve body side. However, this "upward and downward" is merely used for the sake of convenience. That is, the manual value may be installed upside down or may be installed not only on a horizontal plane but also on a vertical plane.

Advantageous Effects of Invention

According to the opening degree detection device for a manual valve of the present invention, the displacement sensor and the target are arranged in the inside of the handle formed in a hollow shape. Accordingly, the displacement sensor and the target are protected by the handle and hence, the detection reliability can be ensured over a long period of time, and the detection accuracy of the opening degree of the fluid flow path can be enhanced. Further, the displacement sensor and the target are integrally mounted in the handle and hence, the opening degree detection device for a manual valve can be easily exchanged. Further, by exchanging a handle of an existing manual valve for the handle in which the opening degree detection device for a manual valve of the present invention is incorporated, it is possible to easily acquire a manual valve provided with the opening degree detection device having the above-mentioned advantageous effects.

Figure 1:
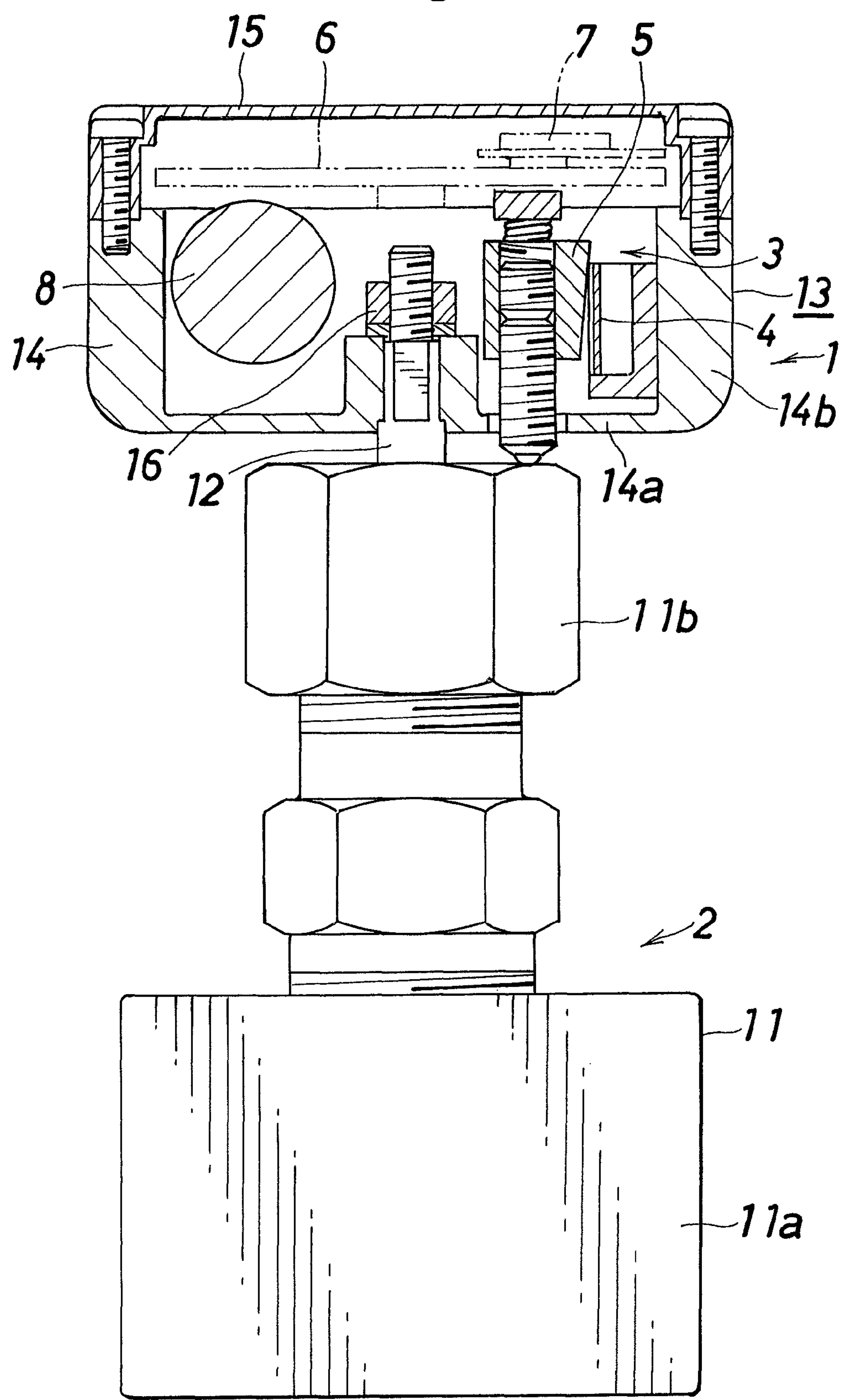
FIG. 1 is a front cross-sectional view showing a first embodiment of an opening degree detection device for a manual valve according to the present invention.
Figure 2:
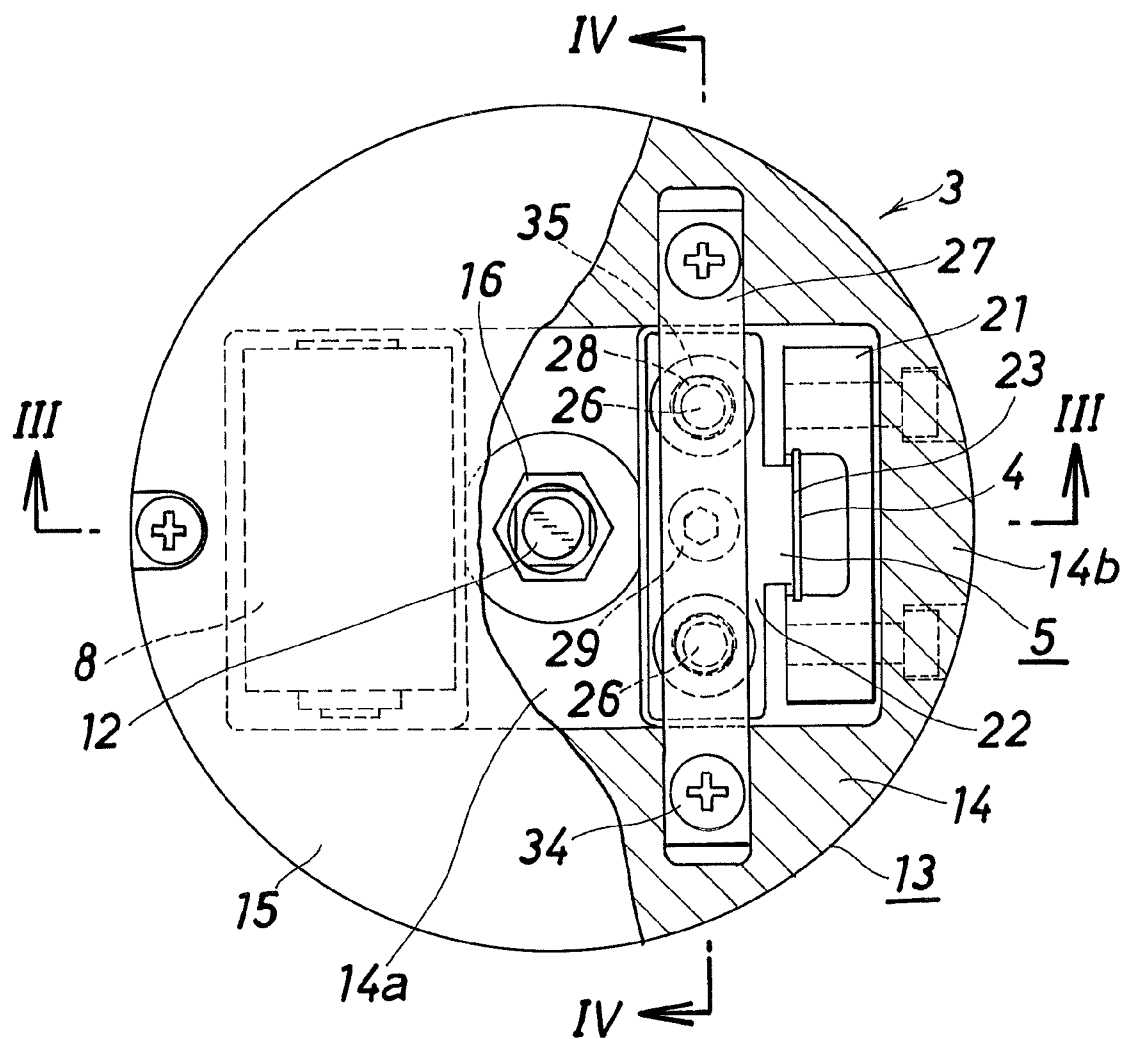
FIG. 2 is a plan view of the opening degree detection device for a manual valve with a part cut away.

REFERENCE SIGNS LIST (1) fluid controller
(2) manual valve
(3) opening degree detection device for a manual valve
(4) displacement sensor
(5) target
(6) CPU
(7) radio module
(8) battery
(9) data monitoring system
(11) valve body
(11*a*) valve casing
(11*b*) bonnet
(12) valve stem
(13) handle
(14) handle base
(14*a*) bottom wall
(14*b*) peripheral wall
(14*c*) thick wall portions
(15) handle cover
(16) nut
(21) sensor support member
(22) target body
(22*a*) female threaded portion
(23) detection-use inclined surface (detection surface)
(24) ball plunger
(24*a*) ball
(25) downwardly projecting portion
(26) guide shaft
(27) pusher member
(28) compression coil spring
(29) male threaded member
(30) through hole
(31) guide shaft insertion hole
(32) recesses
(33) recesses
(33*a*) small diameter portion
(33*b*) large diameter portion
(34) countersunk head screw
(35) linear bushing
(40) leaf spring (biasing member)
(40*a*) horizontal portion
(40*b*) bent portion

DESCRIPTION OF EMBODIMENTS

Embodiments of the present invention are explained in conjunction with drawings hereinafter. In the explanation made hereinafter, upward and downward directions indicate upward and downward directions in FIG. 1.

FIG. 1 shows a fluid controller provided with an opening degree detection device for a manual valve according to the present invention. The fluid controller (1) includes: a manual valve (2) which opens or closes a fluid flow path by a rotational operation of a handle (13); and an opening degree detection device (3) which is incorporated into the handle (13).

The manual valve (2) includes: a valve body (11) which is constituted of a valve casing (11*a*) in which a desired fluid flow path (not shown in the drawing) is formed and a bonnet (11*b*) which is mounted above the valve casing (11*a*); a valve stem (12) which is supported in the inside of the bonnet (11*b*) and opens or closes the fluid flow path by being lifted or lowered while being rotated; and the handle (13) which is fixed to an upper end portion of the valve stem (12).

The handle (13) is formed in a hollow shape by a cylindrical handle base (14) which has a bottom wall (14*a*) and a peripheral wall (14*b*) and a resin-made handle cover (15) which is mounted on the handle base (14) as a cover. A hollow shaped portion of the handle (13) defines a space where the opening degree detection device is arranged. A through hole which allows the upper end portion of the valve stem (12) to pass therethrough is formed in a center portion of the bottom wall (14*a*) of the handle base (14), and a nut (16) is threadedly engaged with a male threaded portion formed on the upper end portion of the valve stem (12) so that the handle base (14) and the valve stem (12) are fixed to each other.

The handle (13) is positioned above the bonnet (11*b*) of the valve body (11), and the handle (13) and the bonnet (11*b*) are arranged coaxially. When the handle (13) is moved upward by rotation thereof, a distance between the handle (13) which constitutes an operation member and the bonnet (11*b*) of the valve body (11) which constitutes a stationary member is changed.

The opening degree detection device (3) is provided for taking out an opening degree of the fluid flow path of the manual valve (2) as digitized data. The opening degree detection device (3) includes: a displacement sensor (4); a target (5) which faces the displacement sensor (4) in an opposed manner; a CPU (6) which processes a value measured by the displacement sensor (4); a radio module (7) which performs transmission/reception of data between the CPU (6) and the outside; and a battery (8) which supplies electricity to the displacement sensor (4), the CPU (6) and the radio module (7).

Hereinafter, the detailed constitution of the first embodiment of the opening degree detection device (3) according to the present invention is explained in conjunction with FIG. 2 to FIG. 6.

The displacement sensor (4) is fixed to a peripheral wall (14*b*) of the handle base (14) by way of a sensor support member (21).

The target (5) includes: a target body (22) having an approximately rectangular parallelepiped shape which is arranged over the handle base (14) at a position away from the valve stem (12) by a predetermined distance; a detection-use inclined surface (23) which is formed on a longitudinal center portion of the target body (22) in a state where the detection-use inclined surface (23) faces a sensor surface of the displacement sensor (4) in an opposed manner from the inside; and a ball plunger (24) which is arranged at the longitudinal center portion of the target body (22) in a state where the ball plunger (24) projects downward.

As described later, the target (5) is configured to be rotated integrally with the handle base (14) by means of a pair of guide shafts (26), a pusher member (27) and a compression coil spring (biasing member) (28), and is also configured to be upwardly and downwardly movable with respect to the handle base (14) (the target (5) is not moved upwardly and downwardly with respect to the valve body (11) even when the handle base (14) is moved upwardly and downwardly with respect to the valve body (11)).

The handle base (14) includes thick wall portions (14*c*) which sandwich the target (5) therebetween from both longitudinal sides thus forming a space in which the target (5) is arranged and movable.

A male threaded portion is formed on an outer periphery of the ball plunger (24), and a through female threaded portion (22*a*) corresponding to the male threaded portion is formed on the longitudinal center portion of the target body (22). The ball plunger (24) is threadedly engaged with the through female threaded portion (22*a*) of the target body (22) from below, and is positioned and fixed to the target body (22) by a male threaded member (29) which is threadedly engaged with the penetrating female threaded portion (22*a*) of the target body (22) from above.

A lower portion of the ball plunger (24) forms a downwardly projecting portion (25) of the target (5). A through hole (30) which allows the downwardly projecting portion (25) to pass therethrough in an upwardly and downwardly movable manner is formed in the bottom wall (14*a*) of the handle base (14). The target (5) is configured such that the target body (22) of the target (5) is placed on the bottom plate (14*a*) of the handle base (14) in a movable manner, and the downwardly projecting portion (25) of the target (5) is allowed to pass through the through hole (30) formed in the bottom wall (14*a*). A lower end of the downwardly projecting portion (25) of the target (5) (that is, a ball (24*a*) positioned at a lower end of the ball plunger (24)) which is allowed to pass through the through hole (30) formed in the bottom wall (14*a*) is received by an upper surface of the bonnet (11*b*) of the valve body (11) (a distance from the valve stem (12) to the downwardly projecting portion (25) of the target (5) being set smaller than a radius of the bonnet (11*b*)). Due to such a constitution, a vertical position of the target (5) with respect to the valve body (11) can be held at a fixed value.

A pair of guide shaft insertion holes (31) is formed on both sides of the target body (22) in the longitudinal direction respectively such that the guide shaft insertion holes (31) sandwich a portion of the target 5 where the detection-use inclined surface (23) and the downwardly projecting portion (25) are provided.

The guide shafts (26) are inserted into the guide shaft insertion holes (31) respectively, and lower end portions of the guide shafts (26) are fitted in recesses (32) formed on the handle base (14) respectively. Further, upper end portions of the guide shafts (26) are fitted in recesses (33) formed on the pusher member (27) respectively. The recess (33) formed on the pusher member (27) has a stepped shape, and the upper end portion of each guide shaft (26) is fitted in a small diameter portion (33*a*) which forms an upper portion of the recess (33), and a large diameter portion (33*b*) which forms a lower portion of the recess (33) receives an upper end of the compression coil spring (28).

The pusher member (27) has a rectangular plate shape elongated in the longitudinal direction of the target body (22), and a length of the pusher member (27) is set larger than a length of the target (5). A countersunk head screw (34) is arranged on both end portions of the pusher member (27), and the pusher member (27) is fixed to the thick wall portions (14*c*) of the handle base (14) by these countersunk head screws (34). Due to such a constitution, the pair of guide shafts (26) is fixed to the handle base (14), and the target (5) is upwardly and downwardly movable with respect to the handle base (14) by being guided by the pair of guide shafts (26).

Each guide shaft insertion hole (31) formed in the target (5) is of a size which allows a linear bushing (35) to be inserted into the guide shaft insertion hole (31). The cylindrical linear bushing (35) which guides the upward and downward movement of the guide shaft (26) in a state where the guide shaft (26) is non-rotatable is inserted into and fixed to the guide shaft insertion hole (31). Although not shown in the drawing, the linear bushing (35) includes: an outer sleeve which is assembled to the guide shaft (26) on which a raceway groove is formed such that the outer sleeve is movable relative to the guide shaft (26); and a plurality of balls which are rotatably mounted between the raceway groove formed on the guide shaft (26) and a raceway groove formed on the outer sleeve. An annular inwardly-projecting edge portion (31*a*) which receives a lower surface of the linear bushing (35) is provided at a lower end of each guide shaft insertion hole (31). An inner diameter of the inwardly-projecting edge portion (31*a*) is of a size which allows the guide shaft (26) to pass through the inwardly-projecting edge portion (31*a*).

The compression coil spring (28) is fitted on an upper portion of each guide shaft (26). An upper end portion of the compression coil spring (28) is inserted into the large diameter portion (33*b*) of the stepped recess (33) formed on the pusher member (27), and a lower end of the compression coil spring (28) is received by an upper surface of the linear bushing (35). Due to such a constitution, the compression coil spring (28) is interposed between the upper surface of the linear bushing (35) and the pusher member (27) so that the linear bushing (35) is biased in the downward direction by the compression coil spring (28) and thereby a downwardly biasing force is always applied to the target (5). Accordingly, it is possible to ensure the smooth upward and downward movement of the target (5) with respect to the handle base (14) without a play.

Figure 3:
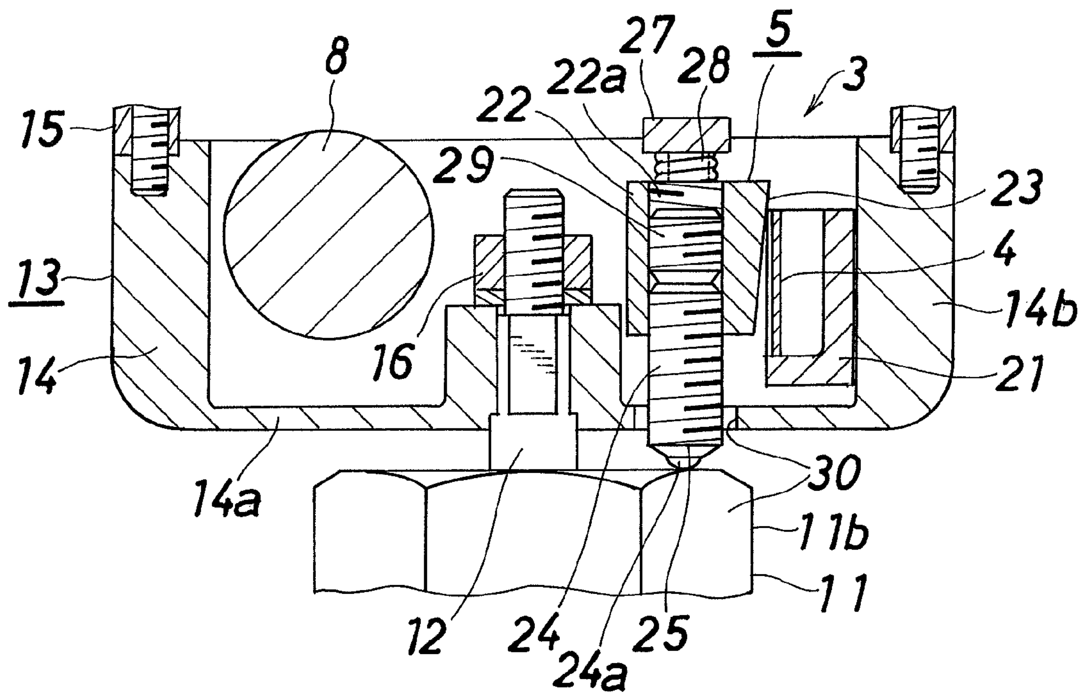
FIG. 3 is a cross-sectional view taken along a line III-III in FIG. 2 showing a state where a valve is fully closed.
Figure 4:
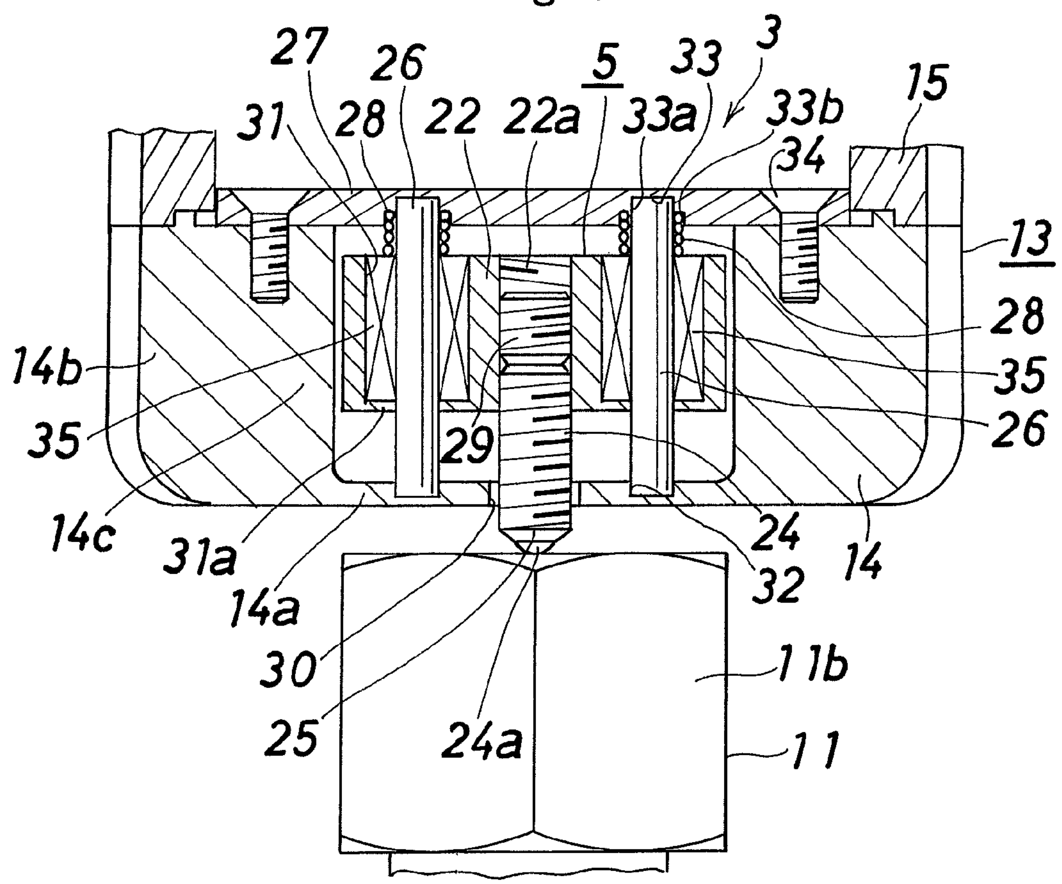
FIG. 4 is a cross-sectional view taken along a line IV-IV in FIG. 2 showing a state where the valve is fully closed.
Figure 5:
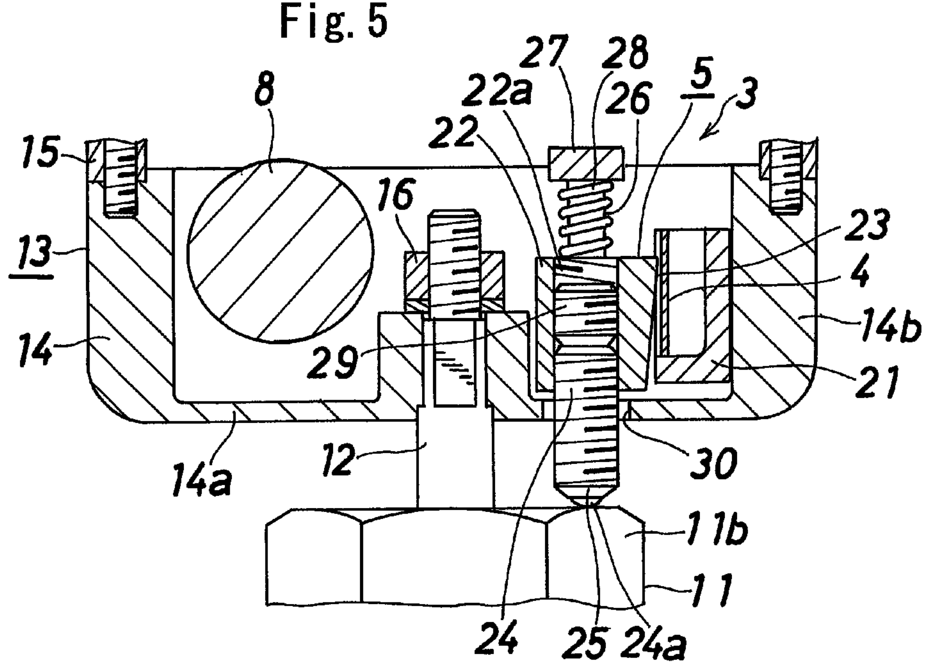
FIG. 5 is a view corresponding to FIG. 3 showing a state where the valve is fully opened.
Figure 6:
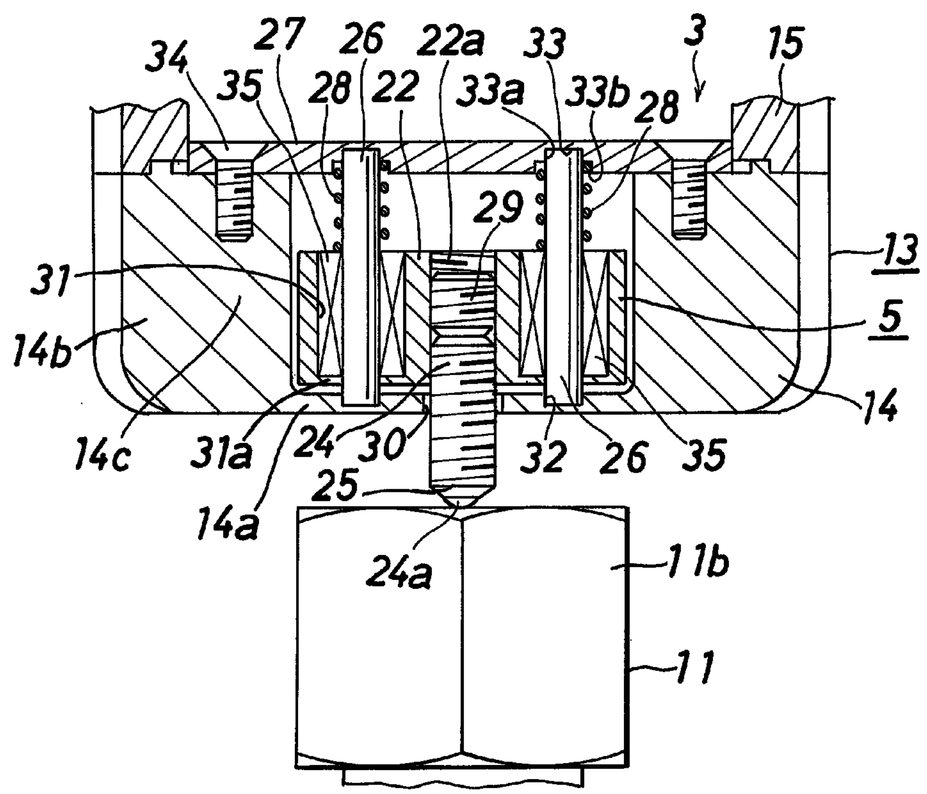
FIG. 6 is a view corresponding to FIG. 4 showing a state where the valve is fully opened.

FIG. 3 and FIG. 4 show the fluid flow path in a closed state. When the handle (13) is rotated with the fluid flow path in such a closed state, the valve stem (12) is moved upwardly while being rotated relative to the valve body (11). In this operation, although the target (5) which is supported on the valve body (11) (on the bonnet (11*b*) of the valve body (11)) is rotated together with the handle (13), a vertical position of the target (5) with respect to the valve body (11) is not changed. Further, the lower ends of the compression coil springs (28) are received by the target (5) so that the position of the compression coil springs (28) is not upwardly and downwardly moved, while the upper ends of the compression coil springs (28) are received by the pusher member (27) so that the upper ends of the compression coil springs (28) are moved upwardly together with the pusher member (27) and thereby the compression coil springs (28) are extended in a state where the compression coil springs (28) bias the target (5) downward. Further, the guide shafts (26) are rotated integrally with the handle base (14) in a state where the guide shafts (26) are sandwiched between the pusher member (27) and the handle base (14), and the target (5) which is not moved upwardly and downwardly with respect to the valve body (11) is moved linearly relative to the guide shafts (26). This linear movement of the target (5) becomes the downward movement with reference to the handle (11). As a result, a state where the fluid flow path is opened as shown in FIG. 5 and FIG. 6 is obtained.

According to the above-mentioned opening degree detection device (3), when the handle (13) is moved upward or downward relative to the valve body (11), a distance between the displacement sensor (4) which is integrally moved with the handle (13) and the detection-use inclined surface (23) of the target (5) which is positioned by the valve body (11) is changed, and such a change in distance can be measured by the displacement sensor (4). Accordingly, by converting such a value measured by the displacement sensor (4) into a distance between the handle (13) and the valve body (11) using an angle of the detection-use inclined surface (23), an amount of movement of the valve stem (12) is obtained. The amount of movement of the valve stem (12) is correlated with the opening degree of the fluid flow path and hence, the opening degree of the fluid flow path can be obtained based on this correlation.

With respect to the opening degree of the fluid flow path, in a state where the handle (13) into which the opening degree detection device (3) is incorporated is mounted on the manual valve (2) (at the time of replacing a packing or performing maintenance or the like after installation of a pipe), the handle (13) is operated to a fully closed position and a point where the opening degree is 0% is set. Then, the handle (13) is operated to a fully open position and a point where the opening degree is 100% is set. Then, using the CPU (6) and a built-in memory, displacement values of the opening degree ranging from the fully opened position to the fully closed position are stored and the linear correction is made with respect to the displacement values of the opening degree. Due to such an operation, irregularity in the opening degree of the fluid flow path which occurs at the time of assembling the manual valve (2) can be absorbed.

According to the above-mentioned opening degree detection device (3), in addition to the displacement sensor (4) and the target (5), the CPU (6) which processes a value measured by the displacement sensor (4) and the radio module (7) which performs transmission/reception of data between the CPU (6) and the outside are also incorporated into the handle (13). Accordingly, as shown in FIG. 7, the obtained opening degree of the fluid flow path is transmitted to the data monitoring system (9) installed outside the opening degree detection device (3) by radio via the radio module (8) so that the presence or non-presence of abnormality is always monitored through a monitor.

Figure 7:
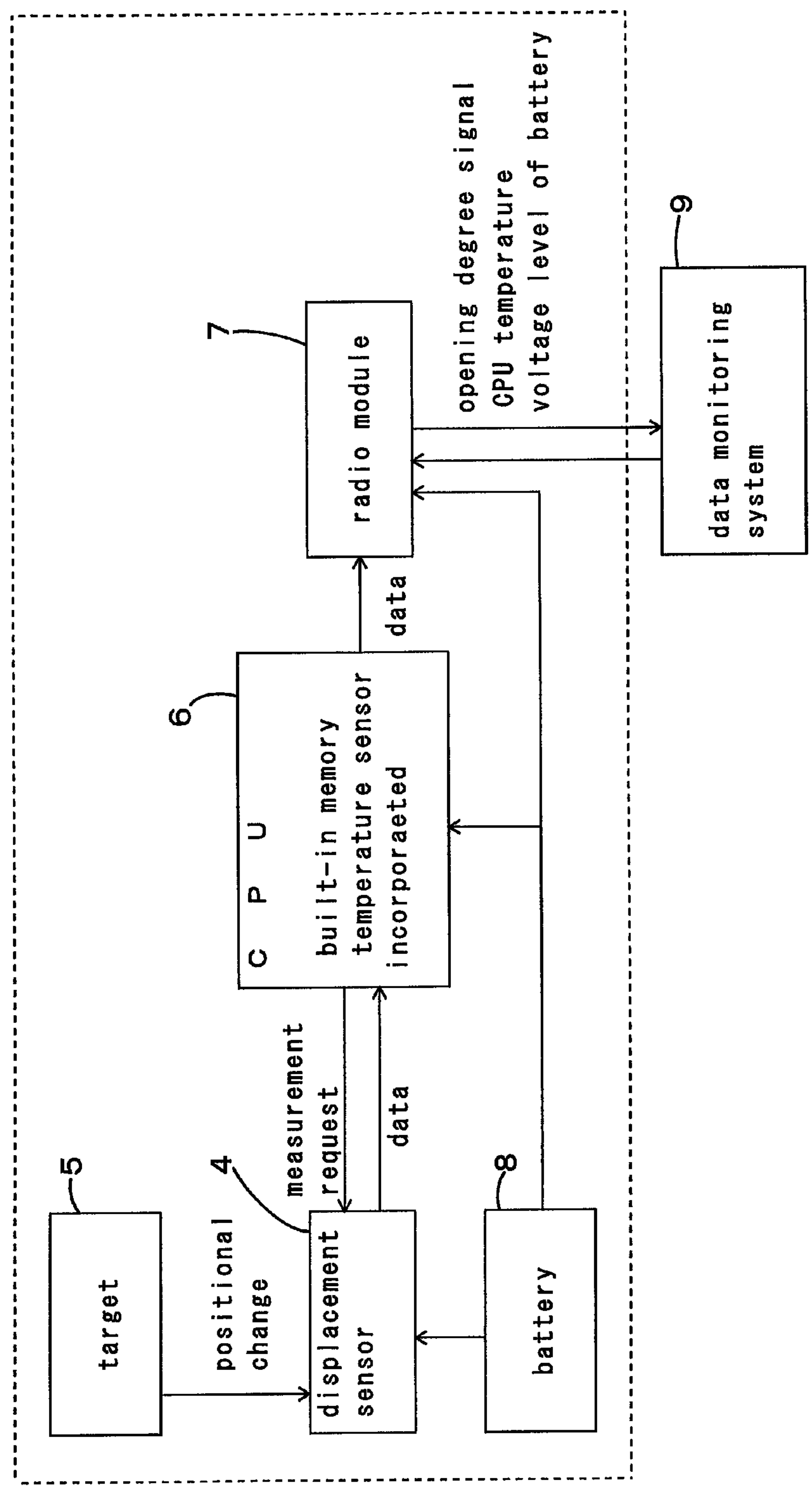
FIG. 7 is a block diagram showing one example of a system which uses the opening degree detection device for a manual valve according to the present invention.

As shown in FIG. 7, in the CPU (6), in addition to the built-in memory which stores data generated when a program is executed by the CPU (6), incorporates a temperature sensor therein. The CPU (6) obtains a value measured by the displacement sensor (4), a value measured by the temperature sensor and a measured voltage value of the battery (8), and transmits an opening degree signal obtained by processing the value measured by the displacement sensor (4), an inside temperature of the CPU and a voltage level of the battery. The data monitoring system (9) receives these information. Due to such a constitution, the opening degree of the manual valve (2) can be detected at a position remote from a place where the manual valve (2) is installed.

The data monitoring system (9) of this embodiment acquires the opening degree signal from the opening degree detection device (3) at predetermined time intervals, and an alarm is outputted when the opening degree does not conform to a predetermined state. Further, an alarm is outputted also when the opening degree does not fall within an initial set opening degree of 0 to 100%. Further, with respect to the temperature of the CPU (6), the data monitoring system (9) obtains a temperature signal at predetermined time intervals, and an alarm is outputted when the temperature does not fall within a use temperature range. With respect to a power source of the battery (8), an alarm is outputted when a power source voltage becomes equal to or below a predetermined voltage. With respect to the predetermined time interval, these data may be obtained one time for every five minutes in standard, for example. Accordingly, a lifetime of the battery (8) can be prolonged (for example, four years or more).

The opening degree signals obtained here are not simple information that the manual valve is in an open state or in a closed state but are information which is given in the form of numerical values ranging from 0 to 100%. Accordingly, in operating the handle (13), an operator can surely understand a state such as a state where the opening degree is supposed to be 0% (fully closed state) but actually is 2% (a state where the fluid flow path is not tightly closed or is started to be gradually opened for some reason) or a state where the opening degree is supposed to be 100% (fully open state) but actually is 95% (a state where the fluid flow path is not completely opened or is started to be gradually closed for some reason). Further, with the use of the temperature sensor incorporated into the CPU (6), by allowing the CPU (6) to estimate a leakage of fluid caused by breaking of a valve element based on the elevation of the temperature, an abnormal state such as a leakage of fluid can be detected on a data monitoring system (9) side. The temperature sensor is not limited to a temperature sensor incorporated into the CPU (6), and any temperature sensor can be used provided that the temperature sensor can measure a temperature of the manual valve (2).

Figure 8:
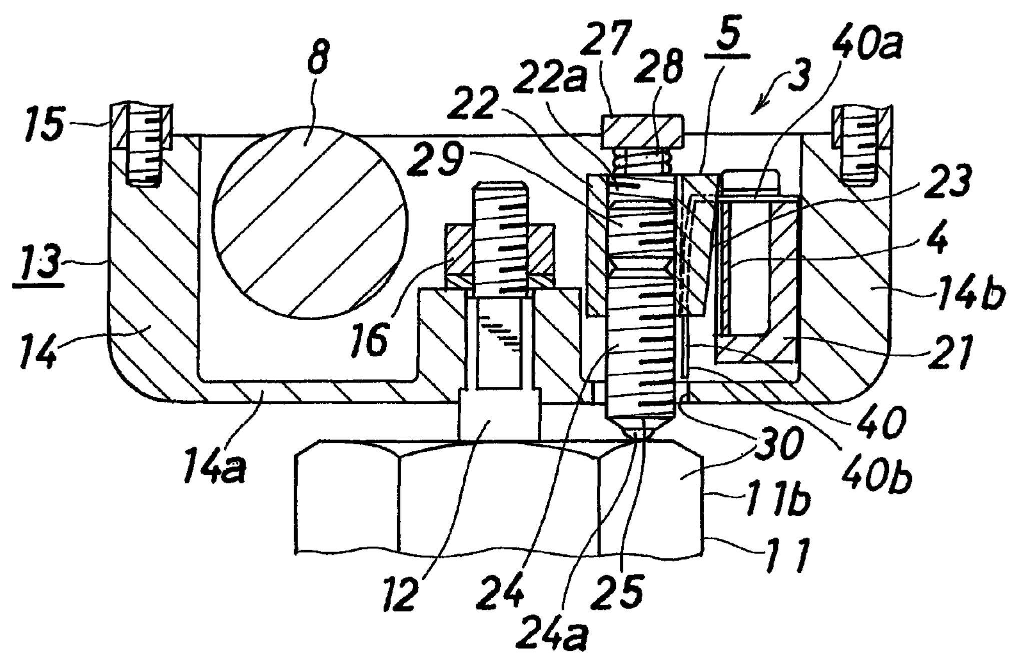
FIG. 8 is a cross-sectional view showing a second embodiment of the opening degree detection device for a manual valve according to the present invention, and is also a view corresponding to FIG. 3.
Figure 9:
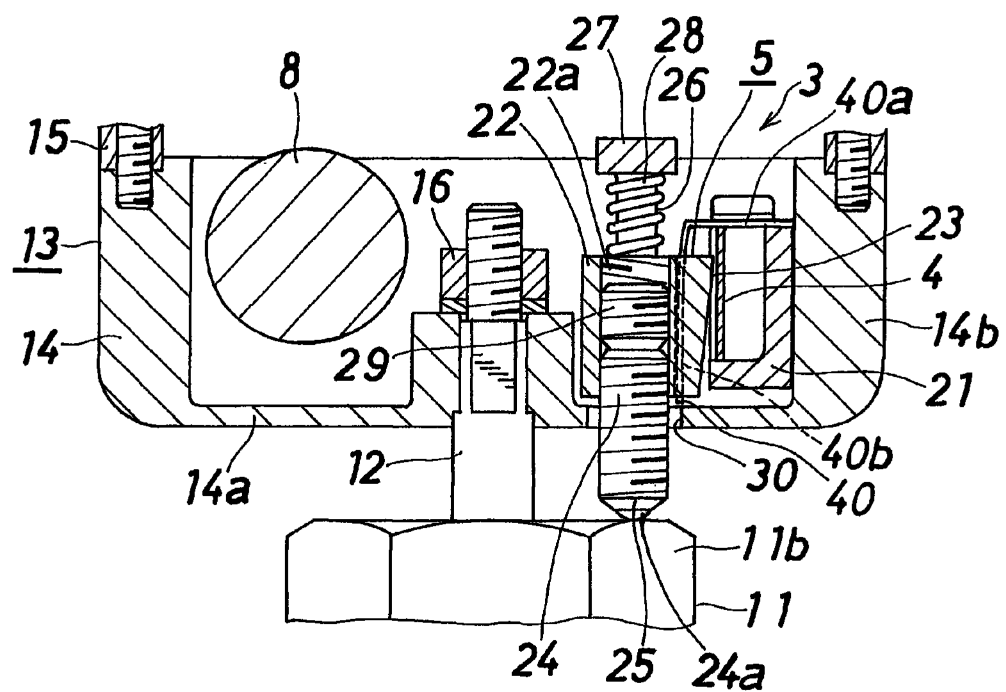
FIG. 9 is a cross-sectional view showing the second embodiment of the opening degree detection device for a manual valve according to the present invention, and is also a view corresponding to FIG. 5.

FIG. 8 and FIG. 9 show a second embodiment of the opening degree detection device (3) according to the present invention. In the drawings, the constitutions equal to the corresponding constitutions of the first embodiment are given the same symbols, and the explanation of the constitutions is omitted.

As shown in FIG. 8 and FIG. 9, in this embodiment, L-shaped leaf springs (biasing member) (40) which apply a resilient force to a target body (22) are mounted on a sensor support member (21). The leaf springs (40) which make a pair are arranged such that the leaf springs (40) sandwich a portion of the target body (22) where a detection-use inclined surface (23) is formed. A horizontal portion (40*a*) of the leaf spring (40) is mounted on the sensor support member (21) by a bolt (not shown in the drawing), and a portion (40*b*) of the leaf spring (40) which is bent with respect to the horizontal portion (40*a*) extends downward between the sensor support member (21) and the target body (22). When the leaf spring (40) is in a free state, the leaf spring (40) is assumed to be in an inclined state where a lower end of the leaf spring (40) is positioned on a target (5) side with respect to a perpendicular and is brought into contact with the target body (22) thus applying a resilient force to the target body (22).

The target body (22) and a ball plunger (24) are threadedly engaged with each other, and a ball (24*a*) of the ball plunger (24) is received by a valve body (11) and hence, the target (5) can be moved smoothly. Here, there exists a possibility that along with the movement of the target body (22), a position of the target body (22) with respect to a sensor surface of the displacement sensor (4) is changed due to a play in a portion where the target body (22) and a ball plunger (24) are threadedly engaged with each other. However, such a play can be suppressed by the leaf springs (40). In this manner, according to the second embodiment, a distance between the target body (22) and the sensor surface of the displacement sensor (4) becomes stable so that the detection accuracy can be further enhanced.

In the above-mentioned embodiments, the target (5) is configured such that the target (5) is rotated together with the handle (13) with respect to the displacement sensor (4) fixed in the inside of the handle (13), but the vertical position of the target (5) is not changed with respect to the valve body (11). However, the same manner of operation and advantageous effect can be acquired even when the above-mentioned structure is reversed such that the target is fixed in the inside of the handle (13), and the displacement sensor (4) is rotated together with the handle (13) but the vertical position of the displacement sensor (4) with respect to the valve body (11) is not changed.

INDUSTRIAL APPLICABILITY

The opening degree detection device for a manual valve according to the present invention can be preferably installed in a manual valve for detecting an opening degree of a fluid flow path. According to the present invention, it is possible to provide an opening degree detection device for a manual valve where the reliability with respect to detection over a long period of time can be secured, and the detection accuracy of an opening degree of the fluid flow path can be enhanced.

The invention claimed is:

1. An opening degree detection device for a manual valve which is mounted on a manual valve where a fluid flow path formed in the inside of a valve body is opened or closed along with the rotational operation of a handle, wherein the opening degree detection device comprises a displacement sensor and a target having a detection surface which is made so as to face the displacement sensor in an opposed manner, and the displacement sensor, the target are arranged in the inside of the handle which is formed in a hollow shape, wherein the displacement sensor and the target are rotated along with the rotation of the handle such that the sensor surface and the detection surface of the target always face each other in an opposed manner.

2. The opening degree detection device for a manual valve according to claim 1, wherein the target includes: a target body which is arranged at a position away from a valve stem by a predetermined distance in the handle; a detection-use inclined surface which is formed on a surface of the target body which faces the displacement sensor in an opposed manner; and a downwardly projecting portion which projects downward from the target body, a through hole which allows the downwardly projecting portion of the target to pass therethrough in an upwardly and downwardly movable manner is formed in a bottom wall of the handle, and a lower surface of the downwardly projecting portion of the target is received by the valve body so that the target is rotated together with the handle but is not upwardly and downwardly moved with respect to the valve body.

3. The opening degree detection device for a manual valve according to claim 2, wherein the handle includes: a handle base which has a peripheral wall and a bottom wall and has a center portion of the bottom wall thereof fixed to the valve stem; and a handle cover which is mounted on the handle base as a cover, wherein the target body is formed in an approximately rectangular parallelepiped shape, the detection-use inclined surface and the downwardly projecting portion are formed on a center portion of the target body in the longitudinal direction, a pair of guide shaft insertion holes are formed on both sides of the target body in the longitudinal direction such that the guide shaft insertion holes sandwich a portion where the detection-use inclined surface and a portion where the downwardly projecting portion is formed, a lower end of each guide shaft which is allowed to pass through each guide shaft insertion hole is received by the handle base, an upper end of each guide shaft is received by a pusher member, and the pusher member is fixed to the handle base and thereby the target is upwardly and downwardly movable with respect to the handle by being guided by the pair of guide shafts.

4. The opening degree detection device for a manual valve according to claim 3, wherein a cylindrical linear bushing which guides the guide shaft is inserted into each guide shaft insertion hole formed in the target, a compression coil spring is fitted on an upper portion of each guide shaft, an upper end of the compression coil spring is received by the pusher member, and a lower end of the compression coil spring is received by an upper surface of the linear bushing respectively.

5. The opening degree detection device for a manual valve according to claim 2, wherein the downwardly projecting portion of the target is formed of a ball plunger which is mounted on the target body, a male threaded portion is formed on an outer periphery of the ball plunger, a through female threaded portion corresponding to the male threaded portion of the ball plunger is formed on the target body, the ball plunger is threadedly engaged with the through female threaded portion of the target body from below, the ball plunger is positioned in and fixed to the target body by a male threaded member which is threadedly engaged with the through female threaded portion of the target body from above, and a ball which is positioned on a lower end of the ball plunger is received by the valve body.

6. The opening degree detection device for a manual valve according to claim 2, wherein the displacement sensor is fixed to the handle by way of a sensor support member, and a biasing member which applies a resilient force to the target body is mounted on the sensor support member.

7. The opening degree detection device for a manual valve according to claim 1, wherein a CPU which executes predetermined processing in accordance with a program, a radio module, and a battery which supplies electricity to these parts are assembled into the inside of the handle.

* * * * *